April 20, 1948.    P. R. GLEY    2,440,083
CONTROL MECHANISM
Filed May 19, 1943    2 Sheets-Sheet 1
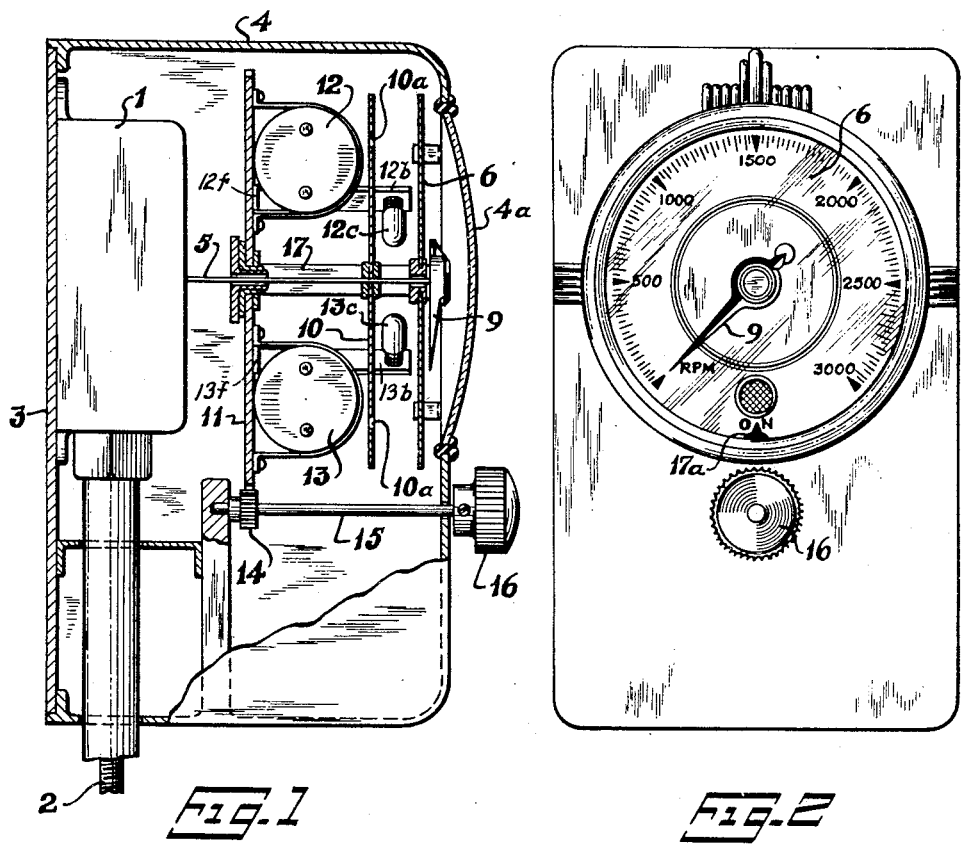
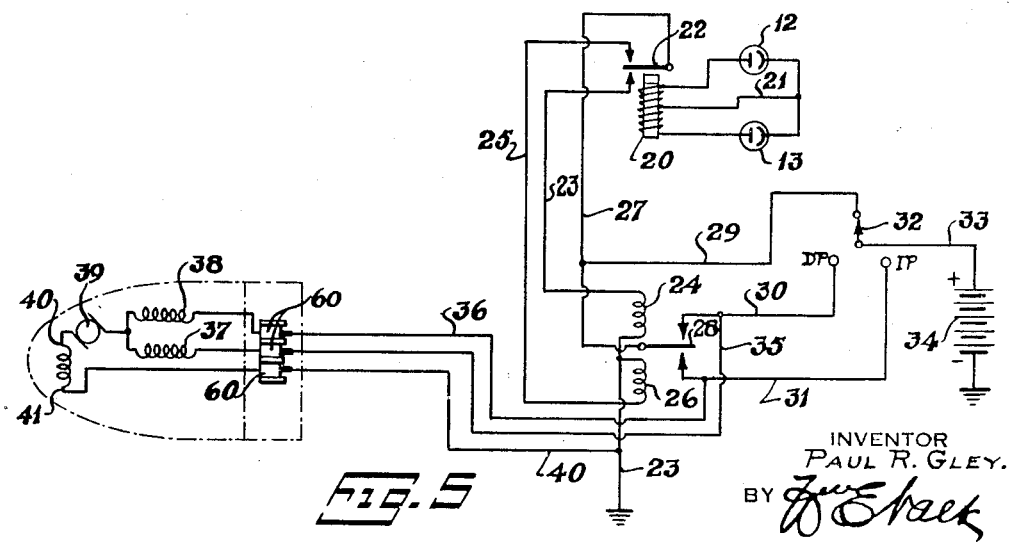
INVENTOR
PAUL R. GLEY.
BY
ATTORNEY April 20, 1948.　　　　P. R. GLEY　　　　2,440,083
CONTROL MECHANISM
Filed May 19, 1943　　　　2 Sheets-Sheet 2
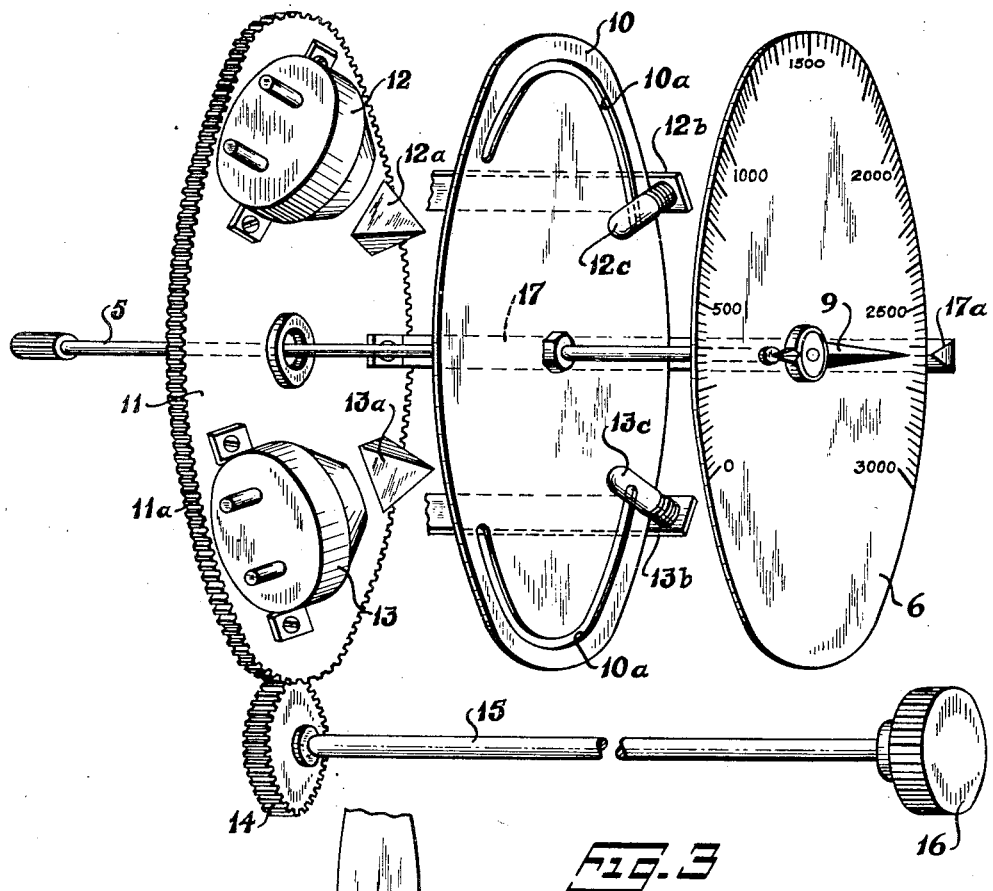
Fig. 3
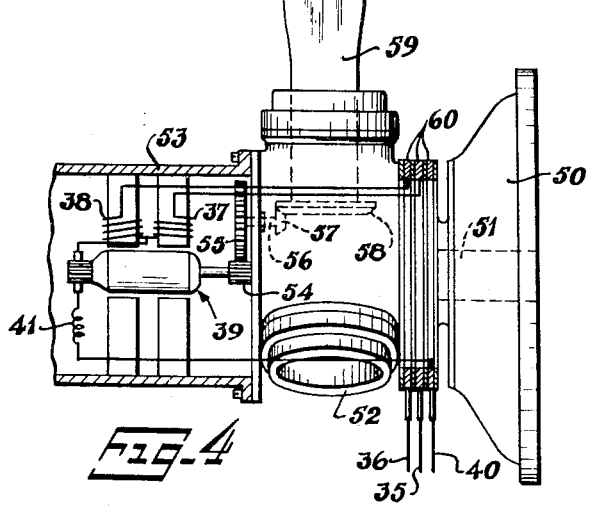
Fig. 4
INVENTOR
PAUL R. GLEY.
ATTORNEY Patented Apr. 20, 1948

2,440,083

UNITED STATES PATENT OFFICE 2,440,083

CONTROL MECHANISM

Paul R. Gley, Haledon, N. J., assignor to Curtiss-Wright Corporation, a corporation of Delaware Application May 19, 1943, Serial No. 487,839

5 Claims. (Cl. 318—265)

My invention relates to control systems.

My invention, in a broad aspect thereof, has reference to a control system comprising a motor or other device to be controlled by a light-sensitive means, the control system comprising means for varying the effect of the light-sensitive means on said motor or device.

My invention, in a more limited aspect, relates to a control system comprising light-sensitive means for effecting operation of an electrical motor which changes the pitch of an aircraft propeller, the effect of said light-sensitive means on said motor being varied in response to change in speed of the aircraft engine by which said propeller is operated.

Various other objects, advantages and features of my invention will become apparent from the following detailed description.

My invention resides in the control system, governor system for changing the pitch of the blades of an aircraft propeller, combinations and arrangements of the character hereinafter described and claimed.

For an understanding of my invention and for an illustration of one of the forms thereof, reference is to be had to the accompanying drawings, in which:

Figure 1 is a vertical sectional view, partly in elevation, showing a housing in which is contained the control mechanism of my invention;

Fig. 2 is a front view of the housing shown in Fig. 1;

Fig. 3 is a perspective view of the control mechanism of my invention;

Fig. 4 is a schematic view illustrating pitch-changing mechanism for an aircraft propeller; and Fig. 5 is a diagrammatic view of a control circuit.

Referring to Fig. 1, I have shown a tachometer 1, or equivalent, which may be any one of a number of well known types and which, in the manner hereinafter described, is operated by a shaft 2, the tachometer 1 being suitably secured to the rear wall 3 of a housing 4, said tachometer 1 comprising a horizontally extending shaft 5, or equivalent, which takes a position dependent upon the rotary speed of the shaft 2. Otherwise, the position of the shaft 5, or equivalent, may be rendered dependent, by any other suitable means, upon the speed of the hereinafter described aircraft engine, or other governed or controllable mechanism.

The tachometer 1 comprises a horizontally extending shaft 5 which, at its forward end, is journalled in a dial 6 fixed to the housing 4 by members 7 and 8. Secured to the extreme end of the shaft 5 is a pointer 9 movable with respect to the calibrated face of the dial 6 which may be observed through a transparent section 4a of the housing 4. As shown in Figs. 2 and 3, the shaft 5, rearwardly of the dial 6, has a disk 10 secured thereto for movement therewith, said disk 10 comprising a pair of oppositely disposed, arcuate slots 10a, 10a formed on a radius having the shaft 5 as a center.

Journalled for free oscillatory movement on the shaft 5 is a disk 11 which, on the surface thereof facing the disk 10, has secured thereto in suitable manner a pair of suitable light-sensitive devices, such as the photo-electric cells 12, 13 and a pair of prisms 12a, 13a. The disk 11 has somewhat greater diameter than the disk 10 and said disk 11 has secured thereto the respective flanges 12f, 13f of a pair of supports 12b, 13b which extend generally parallel with the shaft 5 toward and somewhat beyond the disk 10 where they have the respective electric lamp bulbs 12c, 13c secured thereto in suitable manner.

As illustrated in Figs. 2 and 3, the periphery of the disk 11 is provided with gear teeth 11a and meshing therewith is a gear wheel 14 secured to one end of a suitably journalled shaft 15 which extends forwardly and terminates exteriorly of the housing 4 where it has an operating wheel 16 secured thereto.

Secured to the disk 11 is a member 17 which extends forwardly beyond the disk 10 and dial 6, said member 17 terminating in a pointer 17a movable, when the disk 11 is moved by the wheel 16, with respect to said calibrated face of the dial 6.

My invention, as herein illustrated and described, serves as a governor for effecting change in pitch of the blades of an aircraft propeller in response to change in speed of the engine which drives the propeller, the governor, as hereinafter described and through a suitable electrical circuit, operating an electrical motor in one direction or the other for either increasing or decreasing the pitch of the propeller blades.

As illustrative of a circuit suitable for the purpose stated, reference is to be had to Fig. 4 wherein the hereinbefore described photo-electric cells 12, 13 are shown as connected in series with the winding of a relay 20, a conductor 21 being connected midway between the terminals of the relay winding to form two relay windings in effect, said conductor 21 extending to a conductor which is connected to corresponding terminals of the cells 12 and 13. As shown, the relay 20 is of the polarized type and comprises an armature 22 adapted to occupy a neutral position when both of the relay windings are energized, to occupy its upper position when the upper relay winding is energized and the lower relay winding deenergized, and to occupy its lower position when the lower relay winding is energized and the upper relay winding deenergized.

Coactable with the relay armature 22, when in its lower position, is a fixed contact member forming the terminal of a conductor 23 which includes a relay winding 24 and extends to ground. Coactable with the relay armature 22, when in its upper position, is a fixed contact member forming the terminal of a conductor 25 which includes a relay winding 26 and which is connected to the aforesaid conductor 23 between the relay winding 24 and the ground connection. The relay armature 22 has connected thereto a conductor 27 which leads to an armature 28 coactable with the relay windings 24 and 26 individually.

Extending from the conductor 27 is a conductor 29 which leads to a fixed contact member. Coactable with the relay armature 28 are fixed contact members to which are connected the respective conductors 30 and 31 terminating in fixed contact members, respectively. Coactable individually with the fixed contact members of the respective conductors 29, 30 and 31 is a movable switch member 32 to which is connected a conductor 33 leading to the positive side of a battery 34 or other suitable source of electrical energy, the negative side of which is grounded as indicated.

Branching from the conductors 30 and 31 are the respective conductors 35 and 36 which include the field windings 37 and 38 of an electrical motor 39, the windings 37 and 38 being connected to one terminal of the motor armature, the other terminal of which has connected thereto a conductor 40 which includes an electromagnetic winding 41, utilizable as known in the art for actuating a brake associated with said motor armature, said conductor 40 extending to and being connected to the aforesaid conductor 23 between the junction thereof with the conductor 25 and the ground connection.

The shaft 2 of the hereinbefore described tachometer 1 is operated by the aircraft engine either at a speed which is the same as the crankshaft speed of said engine or at a speed proportional thereto. Accordingly, the shaft 5, the disk 10 and the pointer 9, as a unit, assume a position dependent upon the speed of the engine, such position changing as the speed of the engine changes.

By operation of the wheel 16, the aircraft pilot moves, as a unit, the shaft 15, the disk 11 together with the parts carried thereby and the member 17 together with its pointer 17a, the extent of this movement depending upon the speed at which the pilot desires the aircraft engine to operate. In the example illustrated, the pointer 17a indicates aircraft engine speed of 2650 R. P. M.

The lamp bulbs 12c, 13c are energized constantly in any suitable manner, not shown, during operation of the system herein disclosed. With the parts related to each other as shown in Fig. 3, the disk slots 10a, 10a are so positioned that beams of light from the lamp bulbs 12c and 13c engage the respective prisms 12a and 13a from which said light beams pass to the photo-electric cells 12 and 13, respectively. Under these circumstances, the windings of the relay 20 are energized and the armature 22 thereof is in its neutral position as shown.

In the event that the engine speed decreases below the value stated above, the disk 10 is moved by the tachometer 1 in a counter-clockwise direction, Fig. 3, whereby the upper disk slot 10a moves entirely out of the light path between the lamp bulb 12c and the prism 12a, such movement, however, having no effect on the open light path between the lamp bulb 13c and the prism 13a.

In response to closure of the light path between the lamp bulb 12c and the prism 12a as noted above, the photo-electric cell 12 is deenergized with resultant deenergization of the upper winding of relay 20. Accordingly, the relay armature 22 moves into engagement with the contact member forming the terminal of the conductor 23. As a result, a circuit is closed from the relay armature 22 by way of conductor 23, relay winding 24, to ground by way of said conductor 23, thence from ground to the positive side of the battery 34, conductor 33, switch member 32, conductor 29, and thence back to the relay armature 22 by way of conductor 27. Responsive to closure of the circuit last noted, the relay armature 28 is moved into engagement with the contact member of the conductor 30 to thereby close a circuit which includes the relay armature 28, conductor 30, conductor 35, field winding 37, the armature of motor 39, conductor 40 including the winding 41, to ground by way of the conductor 23, thence from ground to the positive side of the battery 34, conductor 33, switch member 32, conductor 29, and thence back to the aforesaid armature 28 by way of the conductor 27. Closure of the circuit last noted causes rotation of the armature of motor 39 in one direction whereby the pitch of the blades forming the aircraft propeller is decreased. This results in increase in the speed of the aircraft engine and, when this has increased to the value stated above, the disk 10 has resumed the position thereof wherein the disk slots 10a, 10a permit the passage of light beams to the respective photo-electric cells 12 and 13 whereupon the relay armature 22 resumes the position thereof shown in Fig. 5.

In the event that the engine speed increases above the value stated above, the disk 10 is moved by the tachometer 1 in a clockwise direction, Fig. 3, whereby the lower disk slot 10a moves entirely out of the light path between the lamp bulb 13c and the prism 13a, such movement, however, having no effect on the open light path between the lamp bulb 12c and the prism 12a.

In response to closure of the light path between the lamp bulb 13c and the prism 13a as noted above, the photo-electric cell 13 is deenergized with resultant deenergization of the lower winding of relay 20. Accordingly, the relay armature 22 moves into engagement with the contact member forming the terminal of the conductor 25. As a result, a circuit is closed from the relay armature 22 by way of conductor 25, relay winding 26, to ground by way of the conductor 23, thence from ground to the positive side of the battery 34, conductor 33, switch member 32, conductor 29, and thence back to the relay armature 22 by way of conductor 27. Responsive to closure of the circuit last noted, the relay armature 28 is moved into engagement with the contact member of the conductor 31 to thereby close a circuit which includes the relay armature 28, conductor 31, conductor 36, field winding 38, the armature of motor 39, conductor 40 including the winding 41, to ground by way of conductor 23, thence from ground to the positive side of the battery 34, conductor 33, switch member 32, conductor 29, and thence to the aforesaid armature 28 by way of the conductor 27. Closure of the circuit last noted causes rotation of the armature of the motor 39 in a direction the reverse of that described above whereby the pitch of the blades forming the aircraft propeller is increased. This results in decrease in the speed of the aircraft engine and, when this has decreased to the value stated above, the disk 10 has resumed the position thereof wherein the disk slots 10a, 10a permit the passage of light beams to the respective photo-electric cells 12 and 13 whereupon the relay armature 22 resumes the position thereof shown in Fig. 5.

As well understood in the art, the motor 39 hereinbefore referred to is associated with the propeller hub and is rotatable therewith as a unit. This is diagrammatically shown in Fig. 4 wherein the nose 50 of the aircraft engine is illustrated as having extending therefrom a shaft 51 to which the propeller hub 52 is secured. Carried by the hub 52 is a housing 53 which supports the aforesaid pitch-changing motor 39, the windings 37 and 38 thereof being shown as associated with the motor magnetic structure. For changing the propeller blade pitch, the motor armature is shown as carrying a gear wheel 54 which drives a gear wheel 55 carried by a suitably journalled shaft 56 to which is secured a gear wheel 57 meshing with a gear wheel 58 on the end of the propeller blade 59.

Rotatable with the hub 52 are three slip rings 60 disposed in side-by-side insulated relation, the terminals of the windings 37, 38 and the conductor extending from the winding 41 being connected to the respective rings 60. As will be understood from Figs. 4 and 5, the conductors 36, 35 and 40 include fixed contact members which engage the rings 60, respectively.

It will be understood that Fig. 4 is merely a diagrammatic illustration of known arrangements utilizable for the purpose stated. It will also be understood that the showing of the relay 20 and the photo-electric cell circuit of Fig. 5 is intended to be illustrative of known circuits for controlling the position of the armature 22 in the manner described.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A control system comprising a supporting disk and a control disk mounted for rotatable movement with respect to each other about a common axis, a plurality of light-responsive devices, and cooperating light-producing means carried by said supporting disk, said control disk being disposed between said light-responsive devices and said light-producing means, said control disk comprising a plurality of spaced arcuate slots adapted to be traversed, respectively, by light beams passing from said light-producing means to said light-responsive devices respectively, means for moving said control disk in opposite directions respectively in response to increase and decrease in speed of an engine whereby said slots are traversed alternately by the specified light beams, and means for moving said supporting disk to a selected position with respect to said control disk.

2. A control system comprising a control disk, a concentric calibrated disk, a concentric supporting disk independently rotatable on the common disk axis, a plurality of light-responsive devices and cooperating light-producing means carried by said supporting disk, a pointer carried by said supporting disk and disposed in indicating relation with respect to said calibrated disk, said control disk being disposed between said light-responsive devices and said light-producing means, a pointer moved by said control disk with respect to said calibrated disk, said control disk comprising a plurality of spaced arcuate slots adapted to be traversed, respectively, by light beams passing from said light-producing means to said light-responsive devices respectively, means for changing the position of said control disk in accordance with variations in speed of an engine, and means for moving said supporting disk to a selected position with respect to said control disk.

3. In a control system, an electrical motor, a winding for rotating the armature of said motor in one direction, a winding for rotating the armature of said motor in reverse direction, means for energizing said windings individually, said last named means comprising a light-responsive cell system, said light-responsive cell system comprising a pair of members, a pair of light-responsive devices and a cooperative light source carried by one of said members, the other member being adapted to control the passage of light from said light source to said light-responsive devices, and means for moving said one member to a desired position relative to said other member.

4. In a control system, an electrical motor, a winding for rotating the armature of said motor in one direction, a winding for rotating the armature of said motor in reverse direction, means for energizing said windings individually, said last named means comprising a light-responsive cell system, said light-responsive cell system comprising a pair of members, a pair of light-responsive devices and a cooperative light source carried by one of said members, the other member being provided with spaced arcuate slots adapted to be traversed, respectively, by light beams passing from said light-producing means to said light-responsive devices respectively whereby said other member is adapted to control the passage of light from said light source to said light-responsive devices, and means for moving said one member to a desired position relative to said other member.

5. A control system comprising a supporting member and a position controlled member mounted for rotatable movement with respect to each other about a common axis, a plurality of light-responsive devices carried by said supporting member, light producing means directing a light beam toward said light-responsive devices, said position controlled member being disposed between said light-responsive devices and said light producing means, said position controlled member comprising a plurality of translucent portions adapted to be traversed by said light beam in passing from said light producing means to said light-responsive devices, means for moving said position controlled member in opposite directions in response to increase and decrease in speed of a speed controlled mechanism whereby said translucent portions are traversed by said light beam, and means for moving said supporting member to any one of a plurality of positions to adjust the speed datum to which said speed controlled mechanism is to be adjusted.

PAUL R. GLEY.

REFERENCES CITED

The following references are of record in the file of this patent:

UNITED STATES PATENTS

| Number | Name | Date |
|---|---|---|
| Re. 21,533 | Stoekle | Aug. 13, 1940 |
| 1,730,283 | McShane | Oct. 1, 1929 |
| 1,939,443 | Geiselman | Dec. 12, 1933 |
| 1,986,915 | Biggs | Jan. 8, 1935 |
| 2,100,934 | Berges | Nov. 30, 1937 |
| 2,127,687 | Heath | Aug. 23, 1938 |
| 2,134,982 | Mock | Nov. 1, 1938 |
| 2,142,602 | Blethen | Jan. 3, 1939 |
| 2,166,316 | O'Hagan | July 18, 1939 |
| 2,166,824 | Runaldue | July 18, 1939 |
| 2,187,364 | Ratie | Jan. 16, 1940 |
| 2,357,055 | Mydans | Aug. 29, 1944 |

FOREIGN PATENTS

| Number | Country | Date |
|---|---|---|
| 451,520 | Great Britain | Aug. 7, 1936 |
| 372,007 | Great Britain | May 5, 1932 |